(12) United States Patent
Mukherjee et al.

(10) Patent No.: US 10,433,347 B2
(45) Date of Patent: Oct. 1, 2019

(54) METHODS PROVIDING CARRIER SELECTION AND RELATED NETWORK NODES

(71) Applicant: Telefonaktiebolaget LM Ericsson (publ), Stockholm (SE)

(72) Inventors: Amitav Mukherjee, Fremont, CA (US); Bruhtesfa Godana, Stavanger (NO); Daniel Larsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 233 days.

(21) Appl. No.: 15/544,433

(22) PCT Filed: Jan. 28, 2016

(86) PCT No.: PCT/EP2016/051749
§ 371 (c)(1),
(2) Date: Jul. 18, 2017

(87) PCT Pub. No.: WO2016/120360
PCT Pub. Date: Aug. 4, 2016

(65) Prior Publication Data
US 2018/0338335 A1    Nov. 22, 2018

Related U.S. Application Data

(60) Provisional application No. 62/109,989, filed on Jan. 30, 2015.

(51) Int. Cl.
*H04W 76/10* (2018.01)
*H04L 5/00* (2006.01)
*H04L 27/00* (2006.01)

(52) U.S. Cl.
CPC ............ *H04W 76/10* (2018.02); *H04L 5/001* (2013.01); *H04L 27/0006* (2013.01);
(Continued)

(58) Field of Classification Search
CPC ... H04L 27/0006; H04L 5/001; H04L 5/0032; H04L 5/0035; H04L 5/0073; H04W 76/10
(Continued)

(56) References Cited

U.S. PATENT DOCUMENTS 9,497,769 B1 * 11/2016 Zhou ................. H04W 72/1226
2002/0052201 A1 * 5/2002 Wilhelmsson ........ H04W 36/06
455/434
(Continued)

OTHER PUBLICATIONS

Author Unknown, "Technical Specification Group Radio Access Network; Evolved Universal Terrestrial Radio Access (E-UTRA); Physical channels and modulation (Release 12)," Technical Specification 36.211, Version 12.4.0, 3GPP Organizational Partners, Dec. 2014, 124 pages.
(Continued)

*Primary Examiner* — Nathan S Taylor
(74) *Attorney, Agent, or Firm* — Sage Patent Group

(57) ABSTRACT

According to some embodiments of inventive concepts, a method for carrier selection may be provided in a telecommunications system, with the telecommunications system including at least two network nodes. The method may include determining channel interference of the at least two network nodes, and ranking the at least two network nodes based on the channel interference of the at least two network nodes. Related network nodes are also discussed.

10 Claims, 10 Drawing Sheets

(52) U.S. Cl.
CPC ......... *H04L 5/0032* (2013.01); *H04L 5/0035* (2013.01); *H04L 5/0073* (2013.01)

(58) Field of Classification Search
USPC ...................................................... 455/422.1
See application file for complete search history.

(56) References Cited

U.S. PATENT DOCUMENTS

| | | | | |
|---|---|---|---|---|
| 2009/0176453 | A1* | 7/2009 | Wilhelmsson | H04W 36/06 |
| | | | | 455/41.2 |
| 2011/0195700 | A1* | 8/2011 | Kukuchka | H04W 8/18 |
| | | | | 455/422.1 |
| 2012/0213105 | A1* | 8/2012 | Wigren | G01S 5/06 |
| | | | | 370/252 |
| 2014/0098661 | A1* | 4/2014 | Huang | H04L 5/001 |
| | | | | 370/229 |
| 2014/0254494 | A1* | 9/2014 | Clegg | H04W 72/082 |
| | | | | 370/329 |
| 2014/0315593 | A1* | 10/2014 | Vrzic | H04W 52/38 |
| | | | | 455/522 |
| 2016/0249222 | A1* | 8/2016 | Li | H04B 1/713 |

OTHER PUBLICATIONS

Author Unknown, "Technical Specification Group Radio Access Network; Evolved Universal Terrestrial Radio Access (E-UTRA); Physical layer procedures (Release 12)," Technical Specification 36.213, Version 12.4.0, 3GPP Organizational Partners, Dec. 2014, 225 pages.

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.4.0, 3GPP Organizational Partners, Dec. 2014, 410 pages.

Author Unknown, "Broadband Radio Access Networks (BRAN); 5 GHz high performance RLAN; Harmonized EN covering the essential requirements of article 3.2 of the R&TTE Directive," EN 301 893, Version 1.7.1, European Telecommunications Standards Institute (ETSI), Jun. 2012, pp. 1-90.

Garcia, Luis, G. U. et al., "Autonomous Component Carrier Selection: Interference Management in Local Area Environments for LTE-Advanced," IEEE Communications Magazine, vol. 47, Issue 9, Sep. 2009, IEEE, pp. 110-116.

Kyocera, "R1-144955: Further considerations on the essential functionalities for LAA," 3rd Generation Partnership 3roject (3GPP), TSG RAN WG1 Meeting #79, Nov. 17-21, 2014, 10 pages, San Francisco, USA.

Nokia Siemens Networks, "R3-111419: A plan for LTE Rel-11 Carrier Based Interference Management," 3rd Generation Partnership Project (3GPP), TSG-RAN WG3 Meeting #72, May 9-13, 2011, 6 pages, Barcelona, Spain.

Nsn et al., "R1-133484: Interference Management with Operational Carrier Selection," 3rd Generation Partnership Project (3GPP), TSG RAN WG1 #74 Meeting, Aug. 19-23, 2013, 6 pages, Spain, Barcelona.

International Search Report and Written Opinion for International Patent Application No. PCT/EP2016/051749, dated Jun. 9, 2016, 14 pages.

\* cited by examiner

Aggregated bandwidth of 100 MHz

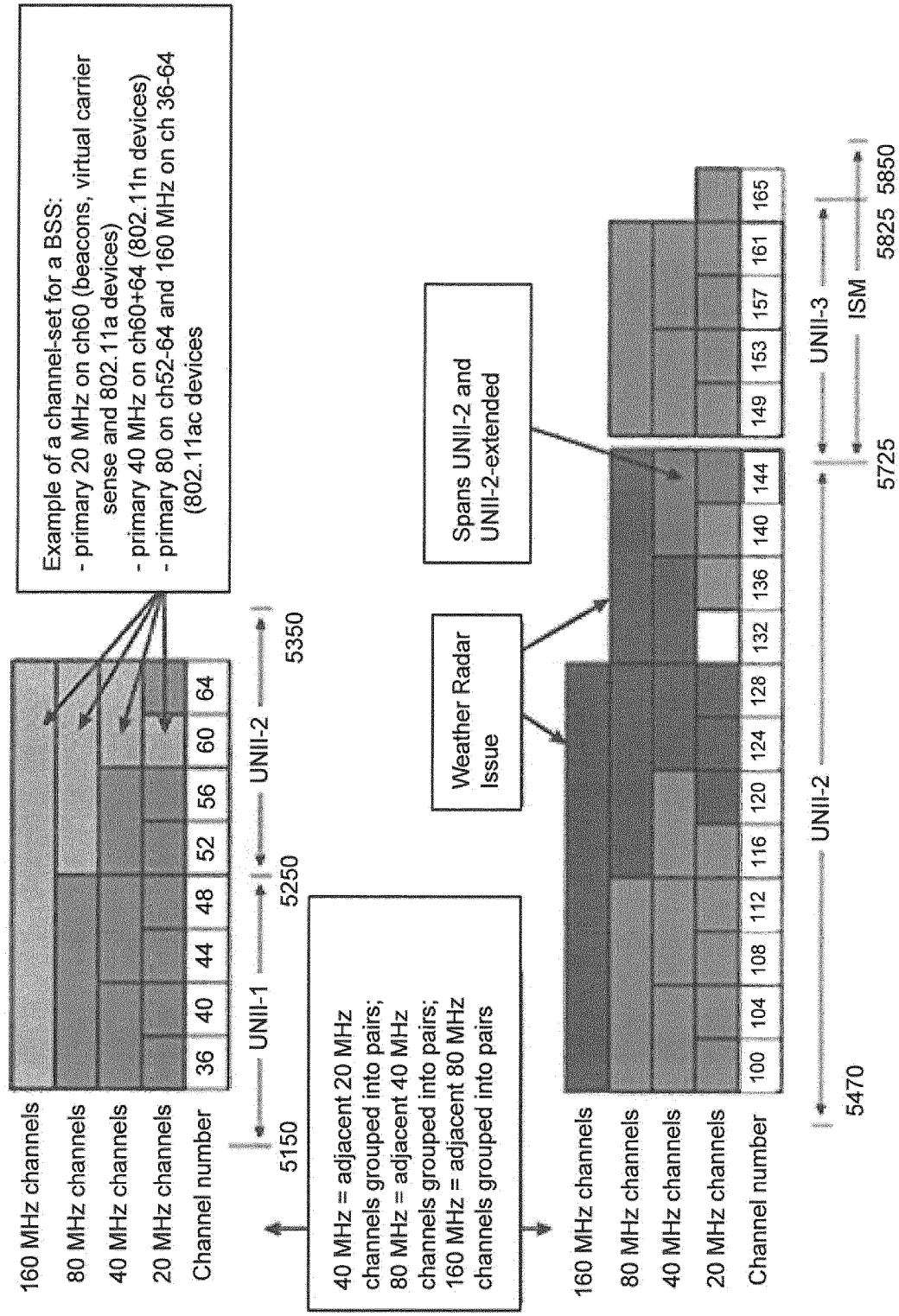

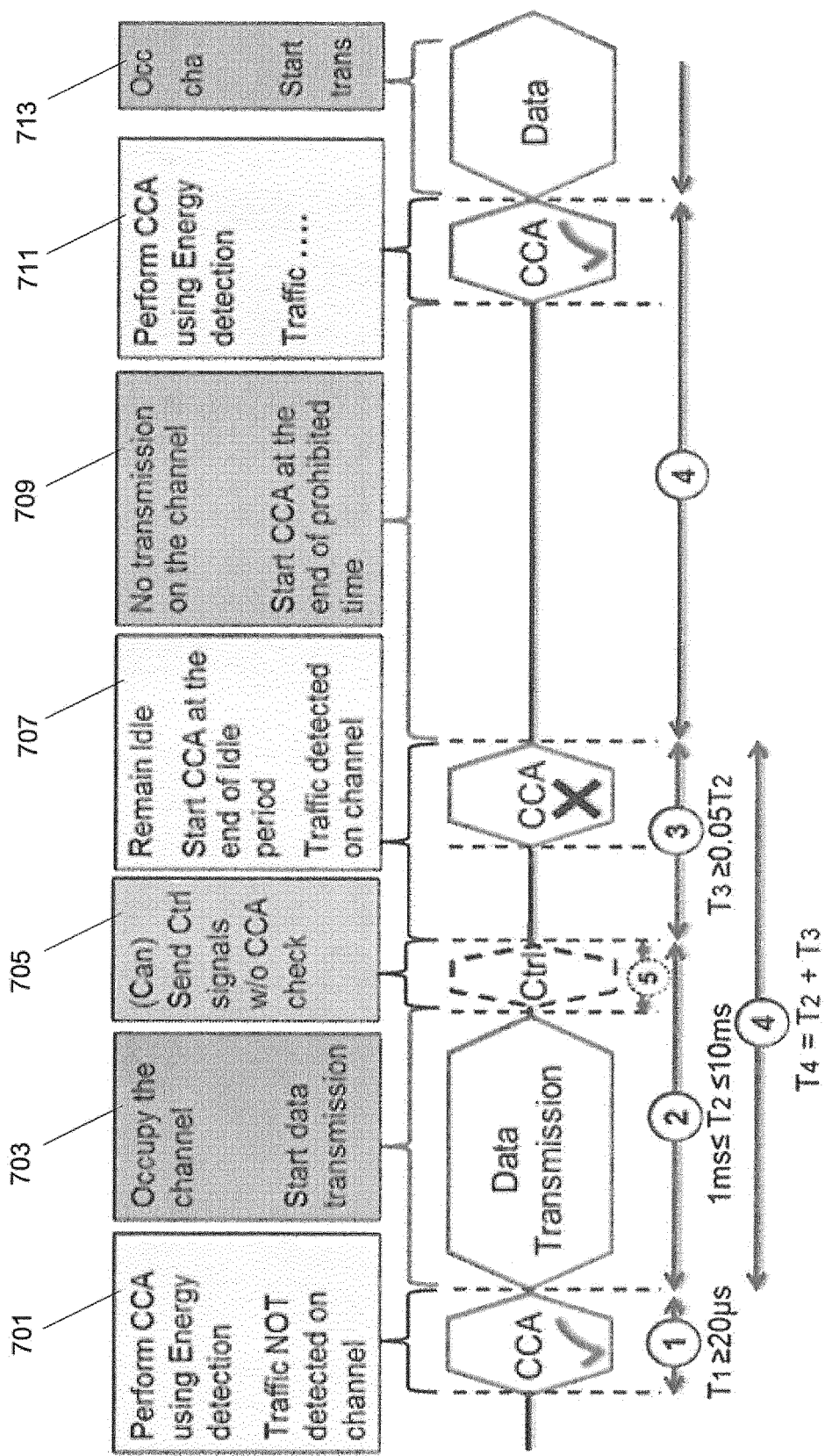

METHODS PROVIDING CARRIER SELECTION AND RELATED NETWORK NODES

This application is a 35 U.S.C. § 371 national phase filing of International Application No. PCT/EP2016/051749, filed Jan. 28, 2016, which claims the benefit of U.S. Provisional Application No. 62/109,989, filed Jan. 30, 2015, the disclosures of which are incorporated herein by reference in their entireties.

TECHNICAL FIELD

The present disclosure is directed to methods for carrier selection in telecommunications systems and related network nodes.

BACKGROUND

The 3GPP initiative "License Assisted Access" (LAA) intends to allow LTE equipment to also operate in the unlicensed 5 GHz radio spectrum. The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

Regulatory requirements, however, may not permit transmissions in the unlicensed spectrum without prior channel sensing. Since the unlicensed spectrum must be shared with other radios of similar or dissimilar wireless technologies, a so called listen-before-talk (LBT) method may need to be applied. Today, the unlicensed 5 GHz spectrum is mainly used by equipment implementing the IEEE 802.11 Wireless Local Area Network (WLAN) standard. This standard is known under its marketing brand "Wi-Fi."

In dense Wi-Fi deployments the number of APs (Access Points) can exceed the number of available unlicensed channels, forcing multiple APs to operate on the same channels. A typical example of prior art for channel selection in Wi-Fi is "LAC: Load-aware channel selection in 802.11 WLANs," Proc. IEEE PIMRC, 2008. LAC is a distributed channel allocation method where multiple APs exchange interference and contention measurements of their associated clients and iteratively derive the optimal channel allocation. In another example of prior art, "Measurement-based self organization of interfering 802.11 wireless access networks," Proc. IEEE INFOCOM, 2007, each AP measures the total received power from all neighbor APs for every channel and selects a channel with a reduced/minimum total power. This is performed at each AP by measuring the RSSI (Received Signal Strength Indicator) of the received beacon frames from all neighboring APs at every channel. However, this method may not take into account the number of associated clients of an AP.

In Rel-13 LAA, carrier selection and dynamic frequency selection (DFS) may be required functionalities for several regions and bands. The carrier selection process may be separate and on a slower time scale compared to the LBT/CCA (Listen Before Talk/Clear Channel Assessment) procedure prior to transmissions on the unlicensed channels.

There is currently no carrier selection specification or associated signaling specified for LTE. So far, LTE has operated exclusively in licensed spectrum. Increasing/Optimizing the carrier or channel selection mechanism for the LAA SCells may lead to improved coexistence and spectrum sharing with Wi-Fi and other unlicensed devices. From a specification perspective, new signaling in LTE may be required to enable coordinated carrier selection.

The approaches described in the Background section could be pursued, but are not necessarily approaches that have been previously conceived or pursued. Therefore, unless otherwise indicated herein, the approaches described in the Background section are not prior to the claims in this application and are not admitted to be prior art by inclusion in the Background section.

SUMMARY

According to some embodiments of inventive concepts, a method for carrier selection may be provided in a telecommunications system, with the telecommunications system including at least two network nodes. The method may include determining channel interference of the at least two network nodes, and ranking the at least two network nodes based on the channel interference of the at least two network nodes.

According to other embodiments of inventive concepts, a method in a network node may be provided for carrier selection in a telecommunications system, the telecommunications system comprising at least two network nodes. The method may include receiving estimated numbers of devices per candidate carrier from each of the at least two network nodes, wherein the estimated numbers of devices per candidate carrier are obtained from the at the least two network nodes respectively. The candidate carriers may be ranked based on a consensus of the estimated numbers of devices per candidate carrier.

According to some other embodiments of inventive concepts, a carrier selection method may be provided in a telecommunications system comprising at least two network nodes. The method may include receiving information related to a number of channels needed for each of the at least two network nodes, and ranking the at least two network nodes based on the number of channels needed for each of the at least two network nodes. In addition, a number of channels may be allocated to a first one of the at least two network nodes that indicates a greatest need for channels such that a sum of adjacent channel leakage to other channels is reduced.

According to still other embodiments of inventive concepts, a node may provide carrier selection in a telecommunications system, wherein the telecommunications system includes at least two network nodes. The node may be adapted to determine channel interference of the at least two network nodes, and rank the at least two network nodes based on the channel interference of the at least two network nodes.

According to yet other embodiments of inventive concepts, a node may provide carrier selection in a telecommunications system, wherein the telecommunications system includes at least two network nodes. The node may be adapted to receive estimated numbers of devices per candidate carrier from each of the at least two network nodes, wherein the estimated numbers of devices per candidate carrier are obtained from the at the least two network nodes respectively. The node may also be adapted to rank the candidate carriers based on a consensus of the estimated numbers of devices per candidate carrier.

According to further embodiments of inventive concepts, a node may provide carrier selection in a telecommunications system comprising at least two network nodes. The node may be adapted to receive information related to a number of channels needed for each of the at least two network nodes, and to rank the at least two network nodes based on the number of channels needed for each of the at least two network nodes. The node may be further adapted to allocate a number of channels to a first one of the at least two network nodes that indicates a greatest need for channels such that a sum of adjacent channel leakage to other channels is reduced.

According to some further embodiments of inventive concepts, a node may provide carrier selection in a telecommunications system, wherein the telecommunications system includes at least two network nodes. The node may include a network interface configured to provide communication with other nodes of the telecommunications system, and a processor coupled with the network interface. The processor may be configured to determine channel interference of the at least two network nodes, and to rank the at least two network nodes based on the channel interference of the at least two network nodes.

According to still further embodiments of inventive concepts, a node may provide carrier selection in a telecommunications system, wherein the telecommunications system includes at least two network nodes. The node may include a network interface configured to provide communication with other nodes of the telecommunications system, and a processor coupled with the network interface. The processor may be configured to receive estimated numbers of devices per candidate carrier from each of the at least two network nodes through the network interface, wherein the estimated numbers of devices per candidate carrier are obtained from the at least two network nodes respectively. The processor may also be configured to rank the candidate carriers based on a consensus of the estimated numbers of devices per candidate carrier.

According to yet further embodiments of inventive concepts, a node may provide carrier selection in a telecommunications system comprising at least two network nodes. The node may include a network interface configured to provide communication with other nodes of the telecommunications system, and a processor coupled with the network interface. The processor may be configured to receive information related to a number of channels needed for each of the at least two network nodes through the network interface, and rank the at least two network nodes based on the number of channels needed for each of the at least two network nodes. The processor may also be configured to allocate a number of channels to a first one of the at least two network nodes that indicates a greatest need for channels such that a sum of adjacent channel leakage to other channels is reduced.

According to more embodiments of inventive concepts, a node may provide carrier selection in a telecommunications system, wherein the telecommunications system includes at least two network nodes. The node may include a determining module adapted to determine channel interference of the at least two network nodes, and a ranking module adapted to rank the at least two network nodes based on the channel interference of the at least two network nodes.

According to still more embodiments of inventive concepts, a node may provide carrier selection in a telecommunications system, wherein the telecommunications system includes at least two network nodes. The node may include a receiving module adapted to receive estimated numbers of devices per candidate carrier from each of the at least two network nodes, wherein the estimated numbers of devices per candidate carrier are obtained from the at the least two network nodes respectively. The node may also include a ranking module adapted to rank the candidate carriers based on a consensus of the estimated numbers of devices per candidate carrier.

According to yet more embodiments of inventive concepts, a node may provide carrier selection in a telecommunications system comprising at least two network nodes. The node may include a receiving module adapted to receive information related to a number of channels needed for each of the at least two network nodes, and a ranking module adapted to rank the at least two network nodes based on the number of channels needed for each of the at least two network nodes. The node may also include an allocating module adapted to allocate a number of channels to a first one of the at least two network nodes that indicates a greatest need for channels such that a sum of adjacent channel leakage to other channels is reduced.

According to some embodiments of inventive concepts, LTE network nodes (e.g., eNBs) may be better able to coexist with WiFi Access Points and/or with adjacent LTE network nodes by improving selection/allocation of carriers/channels.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIG. 5 is a diagram illustrating Channel bonding in IEEE 802.11ac according to some embodiments of inventive concepts;

FIG. 7 is a diagram Illustrating listen before talk (LBT) according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 1:
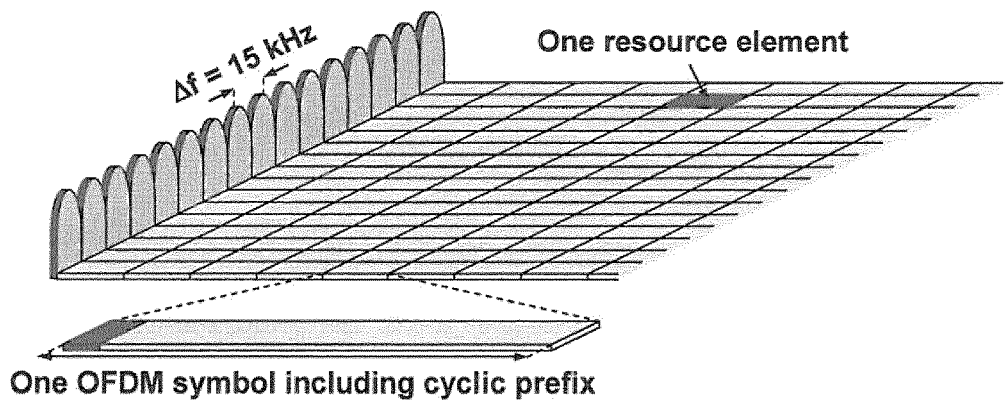
FIG. 1 is a diagram illustrating an LTE downlink physical resource according to some embodiments of inventive concepts.

LTE uses OFDM (Orthogonal Frequency Division Multiple Access) in the downlink and DFT-spread (Discrete Fourier Transform spread) OFDM (also referred to as single-carrier FDMA or single carrier Frequency Division Multiple Access) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA (Single Carrier Frequency Division Multiple Access) symbols in the time domain as OFDM symbols in the downlink.

Figure 2:
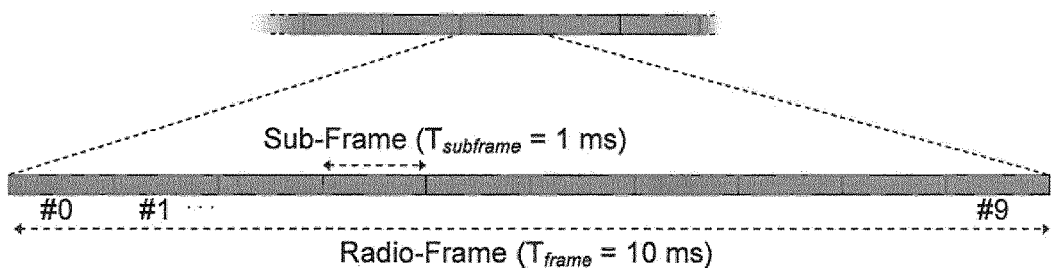
FIG. 2 is a diagram illustrating an LTE time-domain structure according to some embodiments of inventive concepts.

In the time domain, LTE (Long Term Evolution) downlink transmissions are organized into radio frames of 10 ms, each radio frame consisting of ten equally-sized subframes of length Tsubframe=1 ms as shown in FIG. 2. For normal cyclic prefix, one subframe consists of 14 OFDM symbols. The duration of each symbol is approximately 71.4 μs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3.

From LTE Rel-11 onwards, above described resource assignments can also be scheduled on the enhanced Physical Downlink Control Channel (EPDCCH). For Rel-8 to Rel-10 only Physical Downlink Control Channel (PDCCH) may be available.

Figure 3:
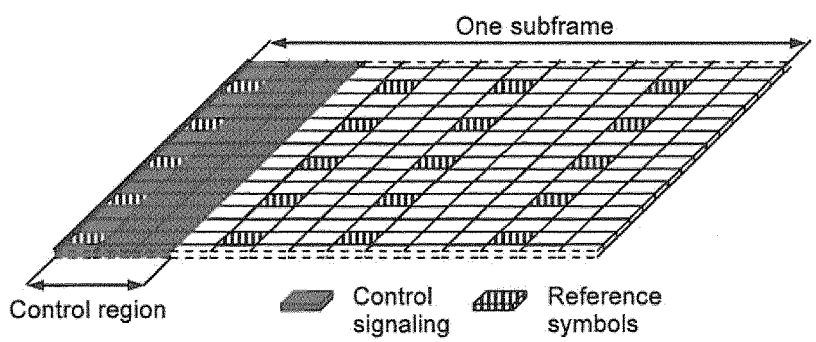
FIG. 3 is a diagram illustrating a normal downlink subframe according to some embodiments of inventive concepts.

The reference symbols shown in FIG. 3 are the cell specific reference symbols (CRS) and may be used to support multiple functions including fine time and frequency synchronization and channel estimation for certain transmission modes.

Figure 4:
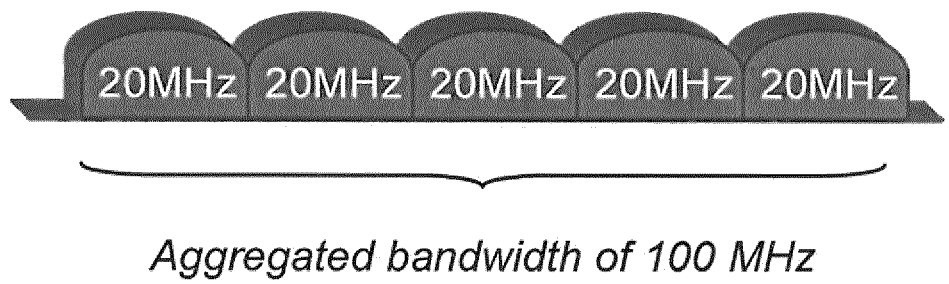
FIG. 4 is a diagram illustrating Carrier aggregation according to some embodiments of inventive concepts.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular, for early LTE Rel-10 deployments it can be expected that there will be a smaller number of LTE Rel-10-capable terminals compared to many LTE legacy terminals. Therefore, it may be useful/necessary to assure an efficient use of a wide carrier also for legacy terminals, i.e., that it is possible to implement carriers where legacy terminals can be scheduled in all parts of the wideband LTE Rel-10 carrier. A straightforward way to obtain this may be by means of Carrier Aggregation (CA). CA implies that an LTE Rel-10 terminal can receive multiple CCs (Component Carriers), where the CCs have, or at least the possibility to have, a same structure as a Rel-8 carrier. CA (Carrier Aggregation) is illustrated in FIG. 4. A CA-capable UE is assigned a primary cell (PCell) which is always activated, and one or more secondary cells (SCells) which may be activated or deactivated dynamically.

The number of aggregated CCs (Component Carriers) as well as the bandwidth of the individual CCs may be different for uplink and downlink. A symmetric configuration refers to the case where the number of CCs in downlink and uplink is the same whereas an asymmetric configuration refers to the case that the number of CCs is different. Moreover, the number of CCs configured in a cell may be different from the number of CCs seen by a terminal: A terminal may, for example, support more downlink CCs than uplink CCs, even though the cell is configured with the same number of uplink and downlink CCs.

In typical deployments of WLAN, carrier sense multiple access with collision avoidance (CSMA/CA) may be used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the range of several APs using the same frequency overlap, this means that all transmissions related to one AP might be deferred in case a transmission on the same frequency to or from another AP which is within range can be detected. Effectively, this means that if several APs are within range, they may have to share the channel in time, and the throughput for the individual APs may be severely degraded.

IEEE 802.11ac and other recent WLAN protocols may be capable of simultaneously operating on multiple unlicensed channels based on the concept of channel bonding. The channel bonding mechanism is equivalent to the carrier aggregation principle of LTE. In the case of 802.11ac, adjacent 20 MHz channels may be grouped into pairs to form 40 MHz channels, adjacent 40 MHz channels may be grouped into pairs to form 80 MHz channels, and so on all the way up to a total of 160 MHz as shown in FIG. 5. This mechanism is associated with several rules for the selection of primary and secondary channels by a new AP when it joins an existing network with pre-occupied channels.

Up to now, the spectrum used by LTE is dedicated to LTE. This may have the advantage that an LTE system does not need to care about coexistence with other non-3GPP radio access technologies in the same spectrum and spectrum efficiency may be increased/maximized. However, the spectrum allocated to LTE is limited and may not meet the ever increasing demand for larger throughput from applications/services. Therefore, a new study item has been initiated in 3GPP to extend LTE to exploit unlicensed spectrum in addition to licensed spectrum.

Figure 6:
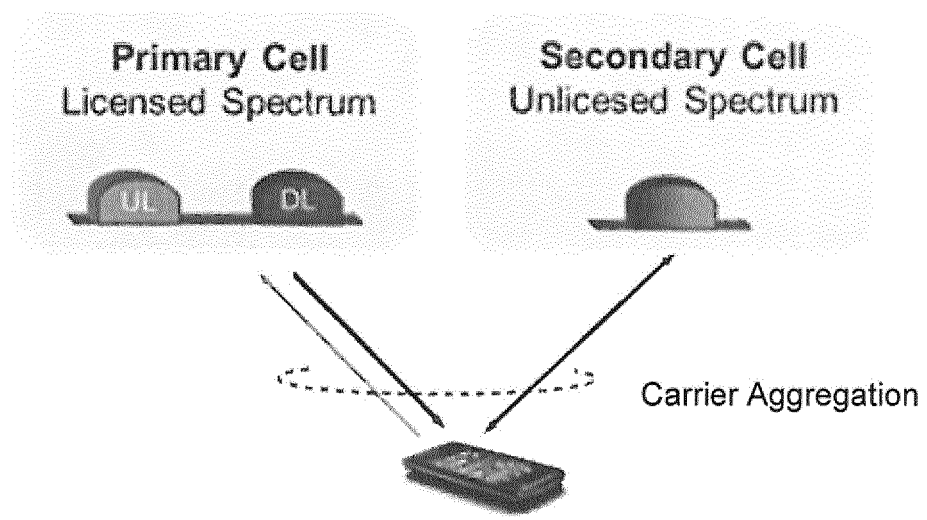
FIG. 6 is a diagram illustrating a CA-capable UE configured with one LAA SCell according to some embodiments of inventive concepts.

With Licensed-Assisted Access to unlicensed spectrum, as shown in FIG. 6, a UE is connected to a PCell in the licensed band and one or more SCells in the unlicensed band. In this application, a secondary cell in unlicensed spectrum may be denoted as an LAA secondary cell (LAA SCell). The LAA SCell may operate in a DL (Downlink)- only mode or operate with both UL and DL traffic. Furthermore, in future scenarios, the LTE nodes may operate in standalone mode in license-exempt channels without assistance from a licensed cell. Unlicensed spectrum can, by definition, be simultaneously used by multiple different technologies. Therefore, LAA as described above may need to consider coexistence with other systems such as IEEE 802.11 (Wi-Fi).

Dynamic frequency selection (DFS) is a LAA regulatory requirement for some frequency bands, e.g., to detect interference from radar systems and/or to reduce/avoid co-channel operation with these systems by selecting a different carrier on a relatively slow time scale. Furthermore, as there is a large available bandwidth of unlicensed spectrum, carrier selection may be required for LAA nodes to select the carriers with low interference and with that achieve good co-existence with other unlicensed spectrum deployments. The basic principle behind carrier selection is for the eNB to scan and sense channels for interference or radar detection, and configure the SCells accordingly based on the outcome of its carrier selection algorithm.

The overall process of LAA transmission may consists of two steps. First, the eNB scans and configures a set of carriers as the candidate LAA SCells. Second, the actual transmission occasions on these carriers are regulated dynamically using a LBT mechanism. For a device not utilizing the Wi-Fi protocol, EN 301.893, v. 1.7.1 provides requirements and minimum behavior for the load-based clear channel assessment. An example to illustrate the LBT procedure in EN 301.893 is provided in FIG. 7. The carrier selection process is separate and most likely on a different time scale from the LBT/CCA procedure prior to transmissions on the unlicensed channels. At block 701, the eNB may perform CCA using energy detection. Responsive to not detecting traffic on the channel at block 701, the eNB may occupy the channel and start data transmission at block 703. At block 705, the eNB can send control signals without a CCA check. At block 707, the eNB may remain idle during an idle period and then start CCA at the end of the idle period. Responsive to detecting traffic on the channel at block 707, the eNB may wait during a prohibited time and start CCA at the end of the prohibited time at block 709. At block 711, the eNB may perform CCA using energy detection, and responsive to the CCA of block 711 indicating that the channel is clear at block 711, the eNB may occupy the channel.

Various embodiments of inventive concepts disclosed herein may overcome one or more of the potential problems explained above with some previously known approaches.

Efficiency and/or interference reduction of a carrier selection process by LAA SCells or standalone LTE-U cells may be improved by introducing coordinated carrier selection (CCS).

Coordinated carrier selection may provide a number of advantages for LAA telecommunications systems. For example LAA LTE may coexist better with Wi-Fi, as well as with adjacent LAA LTE cells by selecting cleaner channels or channels with lower traffic load. Further, standalone LTE-U in license-exempt channels may coexist better with Wi-Fi, as well as with adjacent LTE cells in unlicensed spectrum. Other advantages may include reducing/avoiding Imbalanced carrier allocations where some LAA SCells grab a majority of the channels. The interference and adjacent channel leakage can be reduced/minimized for channels occupied by Wi-Fi. Using CCS, all the available carriers may be distributed among the LAA SCells under an operator.

According to some embodiments, the signaling used/needed to enable coordinated carrier selection in LAA LTE and standalone LTE-U may be specified. Four coordinated carrier selection algorithms may also be provided that can improve performance compared to known selection methods.

The efficiency and interference reduction of the carrier selection process by LAA SCells or standalone LTE-U cells may be improved by introducing coordinated carrier selection (CCS).

Carrier selection for LAA may be a distributed scheme where the eNB first performs individual measurements, such as average received power on each channel, for example. This is followed by autonomously choosing a subset of carriers to be configured and activated as SCells for UEs. Actual transmissions then take place based on a LBT procedure.

Distributed carrier selection may lead to several undesirable outcomes, such as:
  Only a subset of the available carriers may be used by LAA SCells belonging to the same operator.
  One or more carriers may be shared by adjacent SCells.
  With Imbalanced allocation, some SCells may grab a majority of the channels and the remaining SCells may be crowded out.

Figure 8:
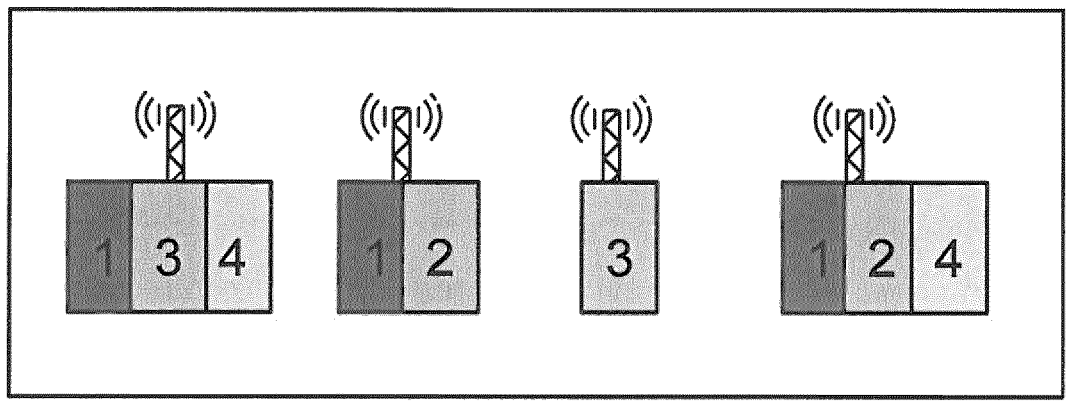
FIG. 8 is a block diagram illustrating Distributed channel selection with imbalanced outcome according to some embodiments of inventive concepts.

An example of an imbalanced allocation with carrier reuse between adjacent SCells is shown in FIG. 8. Therefore, a CCS mechanism can reduce/avoid undesirable outcomes of a purely distributed scheme, by exchanging information such as received power levels and traffic parameters between LAA (S)Cells over backhaul links or through over-the-air signaling. CCS will be feasible at least for the LAA eNBs within the same network and belonging to the same operator.

Figure 9:
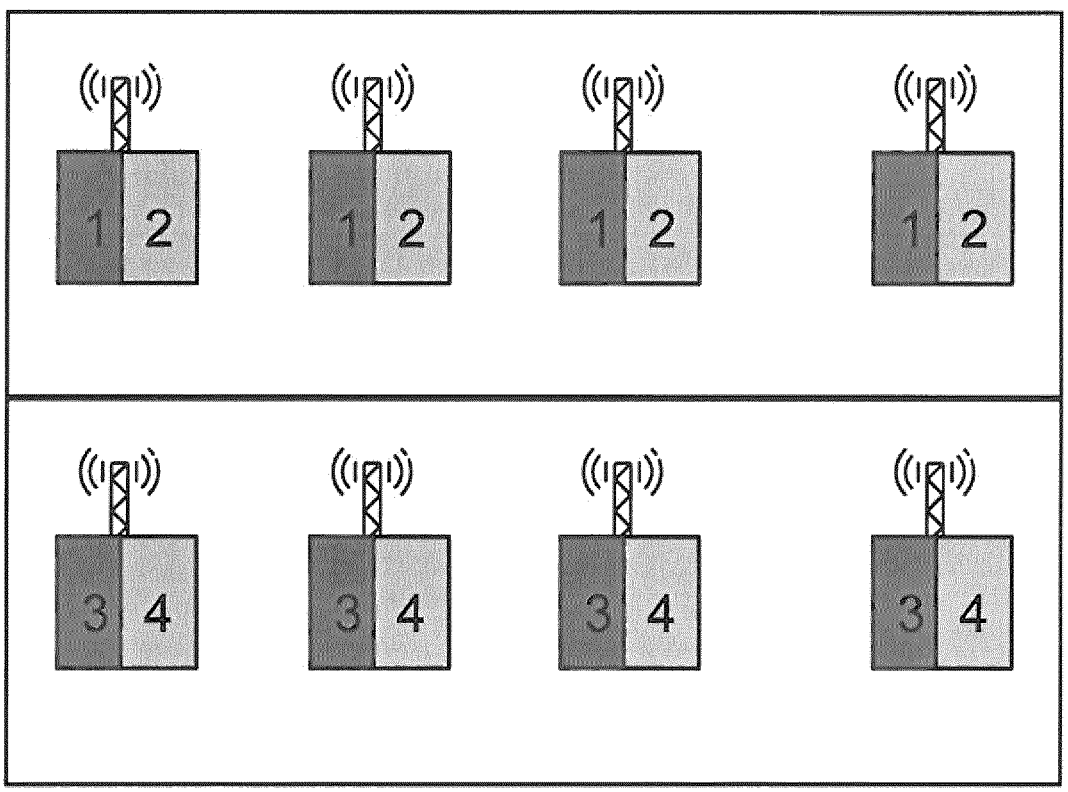
FIG. 9 is a block diagram illustrating Distributed channel selection with a ping-pong effect according to some embodiments of inventive concepts.

Another issue with distributed channel selection is that a "ping pong effect" may happen. Consider four APs which start/boot up by initializing their selection to channels 1 and 2 as shown in FIG. 9. Then, after obtaining interference measurements simultaneously until the next channel re-selection time, all APs see that channel 3 and 4 are free, while 1 and 2 are congested. So, all of the APs move to channel 3 and 4. In the next re-selection, the APs again see that channel 1 & 2 are free while 3 & 4 are congested. Then, all APs move back to channels 1 & 2. This ping-pong effect may continue. Such problems may be reduced/solved by CCS which is aware of the number of APs sharing the channel. As a result, CCS can allocate two of the APs to channels 1 & 2 and the remaining two to channels 3 & 4.

Consider a LAA deployment where a single operator controls a network of multiple, non-colocated LAA eNBs. In first embodiments, the objective is for LAA cells to occupy channels with the least average interference levels. The following CCS algorithm is proposed:
 1. The operator orders eNBs in order of decreasing interference, let these ordering vectors be order1 and order2
 2. eNB ordering is obtained by interleaving these vectors order1 and order2
 3. The network starts with a carrier candidate set of all possible channels.
 4. After an eNB selects a channel from its network frequency candidate set, that channel is removed from that network's carrier candidate set.
 5. Perform one or more iterations until the carrier candidate set is exhausted.

In second embodiments, the objective is for LAA cells with higher traffic loads to occupy channels with the least incumbent Wi-Fi devices. The following CCS algorithm is proposed:
1. Each eNB computes an individual estimate of the number of non-LAA (such as Wi-Fi) devices per candidate carrier.
2. The individual channel estimates and the expected traffic load of each eNB are exchanged. A consensus, overall estimate of the number of non-LAA (such as Wi-Fi) devices on each candidate carrier is derived.
3. The candidate carriers are ranked in ascending order of estimated non-LAA (such as Wi-Fi) devices.
4. LAA SCells with higher offered load are assigned carriers with the fewest non-LAA devices with higher probability. Already assigned carriers are removed from the network's carrier candidate set.
5. One or more iterations are performed until the carrier candidate set is exhausted.

With regard to the second CCS method above, there may be multiple possible ways for LAA cells to acquire an estimate of the number of Wi-Fi devices on each channel:

Blind estimation: LAA looks at received power level fluctuations with spikes of duration equal to Wi-Fi TXOP (Transmission Opportunity) or beacons or ACK frames or RTS/CTS (Request To Send/Clear To Send) messages in the channel.

LAA cells decode Wi-Fi signals or beacons without Wi-Fi cooperation.

LAA cells are equipped with Wi-Fi radios which can read other Wi-Fi signals and pass information to LAA higher layers.

UEs report Wi-Fi measurements such as RSSI (Received Signal Strength Indicator), RCPI (Received Channel Power Indicator), or RSNI (Received Signal To Noise Indication) information to LAA eNB.

In a third embodiment, LAA cells may reduce/minimize aggregate adjacent channel interference leakage power caused to adjacent channels. The following CCS algorithm is proposed:
1. LAA eNBs exchange information to determine how many channels each of them needs to occupy in order to serve their traffic. The eNBs are then sorted in descending order of their channel requirements.
2. Starting with the LAA eNB requiring the most channels, allocate the required channels to it such that the sum adjacent channel leakage power to the channels not allocated to it is reduced/minimized.
3. Continue down the list of eNBs and perform the same allocation procedure for each, until all eNBs have been allocated channels.

In another embodiment, the objective is to reduce/minimize a number of Wi-Fi primary channels that are occupied by the LAA eNBs. This assumes that one or more of the LAA eNBs can detect or decode Wi-Fi beacon signals to determine which unlicensed channels are used as Wi-Fi primary channels. The following CCS algorithm is proposed:
1. LAA eNBs exchange a list of the unlicensed channels that are used as Wi-Fi primary channels. The set of all available unlicensed channels is then split into two subsets S1 and S2, where S1 is the set of all unlicensed channels that are not used as primary channels by Wi-Fi, and S2 is the set of the remaining unlicensed channels that are used as primary channels by Wi-Fi.
2. LAA eNBs exchange information to determine how many channels each of them may need to occupy in order to serve their traffic. The eNBs are then sorted in descending order of their channel requirements.
3. Starting with the LAA eNB requiring the most channels, the required channels are allocated to it from set S1 based on the minimum interference power or minimum adjacent channel leakage power criterion of the previous algorithms.
4. Continue down the list of eNBs and perform the same allocation procedure for each eNB by restricting channels to be taken from set S1, until all eNBs have been allocated channels.
5. At any step, if the lowest number of LAA eNBs allocated to any channel in set S1 exceeds some threshold, then start allocating channels from both S1 and S2.

It is understood that in step 5, a different criterion based on interference levels or load may be used to determine when to start allocating channels from S2.

In a further embodiment, CCS algorithms and associated signaling are applied to enhanced CA (Carrier Aggregation) with 32 or more component carriers. In this case, the eNBs may be configured to report or exchange parameters for only a subset of the candidate carriers, or may exchange parameters for a pre-specified grouping of candidate carriers. An example of a carrier grouping is a set of 8 carriers.

There are multiple possible signals that can be exchanged between LAA eNBs for the purpose of CCS. In another embodiment, one or more of the following signals or their related variations are proposed to be exchanged for the purposes of CCS:
1. A bitmap with either current carrier selection, or upcoming carrier selection choices that will be valid for the next X ms.
2. For each eNB, ordered lists of candidate channels sorted by received interference levels.
3. Quantized values of average received interference powers per candidate carrier.
4. A per-eNB estimate of the number of non-LAA devices active on each candidate carrier.
5. A list of the unlicensed channels that are used as Wi-Fi primary channels.
6. The DL-only or (DL+UL) traffic load of each eNB and the number of associated LAA-capable UEs.

For purposes of illustration and explanation only, embodiments of inventive concepts are described herein in the context of operating in a RAN (Radio Access Network) that communicates over radio communication channels with UEs (also referred to as user equipments, user equipment nodes, wireless terminals, mobile terminals, wireless devices, etc.). It will be understood, however, that inventive concepts are not limited to such embodiments and may be embodied generally in any type of communication network. As used herein, a legacy or non-legacy wireless terminal (also referred to as a UE, user equipment, user equipment node, mobile terminal, wireless device, etc.) can include any device that receives data from and/or transmits data to a communication network, and may include, but is not limited to, a mobile telephone ("cellular" telephone), laptop/portable computer, pocket computer, hand-held computer, an M2M device, IoT (Internet of Things) device, and/or desktop computer.

Note that although terminology from 3GPP (3rd Generation Partnership Project) LTE (Long Term Evolution) has been used in this disclosure to provide examples of embodiments of inventive concepts, this should not be seen as limiting the scope of inventive concepts to only the aforementioned system. Other wireless systems, including WCDMA, WiMax, UMB and GSM, may also benefit from exploiting ideas/concepts covered within this disclosure.

Also, note that terminology such as eNodeB (also referred to as a base station, eNB, etc.) and UE (also referred to as user equipment, user equipment node, wireless terminal, mobile terminal, wireless device, etc.) should be considering non-limiting.

Figure 10:
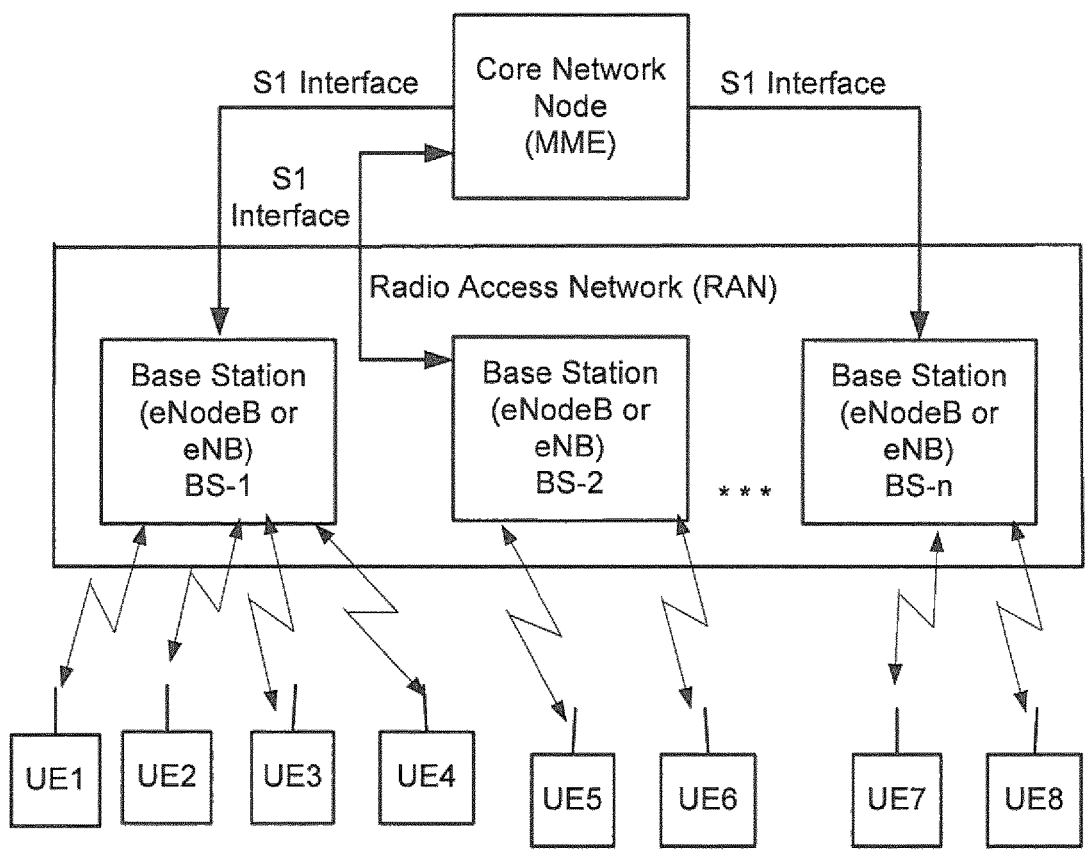
FIG. 10 is a block diagram illustrating radio access networks according to some embodiments of inventive concepts.

FIG. 10 is a block diagram illustrating a Radio Access Network (RAN) according to some embodiments of present inventive concepts. As shown, communications between base stations and one or more core network nodes (e.g., Mobility Management Entity MME or Service GPRS Support Node SGSN) may be provided using respective S1 interfaces. Each base station BS may communicate over a radio interface (including uplinks and downlinks) with respective wireless terminals UEs in a respective cell or cells supported by the base station. By way of example, base station BS-1 is shown in communication with wireless terminals UE1, UE2, UE3, and UE4, base station BS-2 is shown in communication with wireless terminals UE5 and UE6, and base station BS-n is shown in communication with wireless terminals UE7 and UE8.

Figure 11:
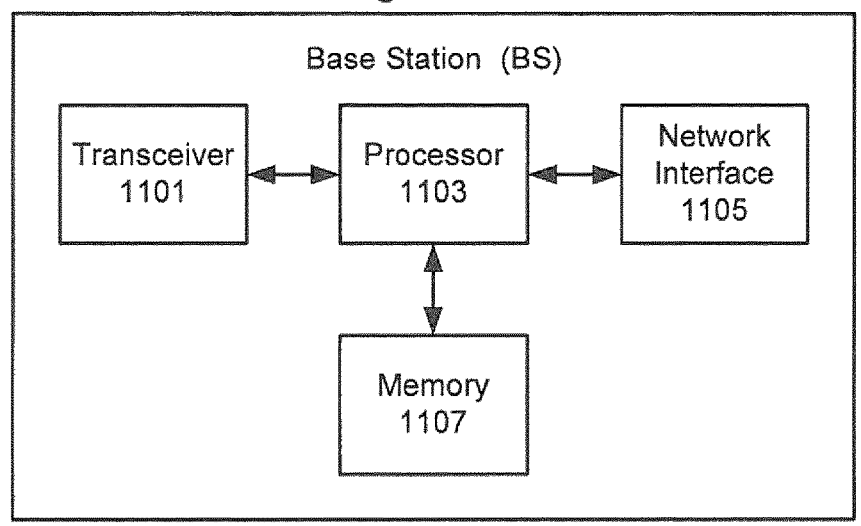
FIG. 11 is a block diagram illustrating a base station of FIG. 10 according to some embodiments of inventive concepts.

FIG. 11 is a block diagram illustrating elements of a base station BS of FIG. 10. As shown, a base station BS may include a transceiver circuit 1101 (also referred to as a transceiver or radio interface or a communication interface) configured to provide radio communications with a plurality of wireless terminals, a network interface circuit 1105 (also referred to as a network interface) configured to provide communications with other base stations of the RAN (e.g., over the X2 interface), and a processor circuit 1103 (also referred to as a processor) coupled to the transceiver circuit and the network interface circuit, and a memory circuit 1107 coupled to the processor circuit. The memory circuit 1107 may include computer readable program code that when executed by the processor circuit 1103 causes the processor circuit to perform operations according to embodiments disclosed herein. According to other embodiments, processor circuit 1103 may be defined to include memory so that a memory circuit is not separately provided.

Figure 12:
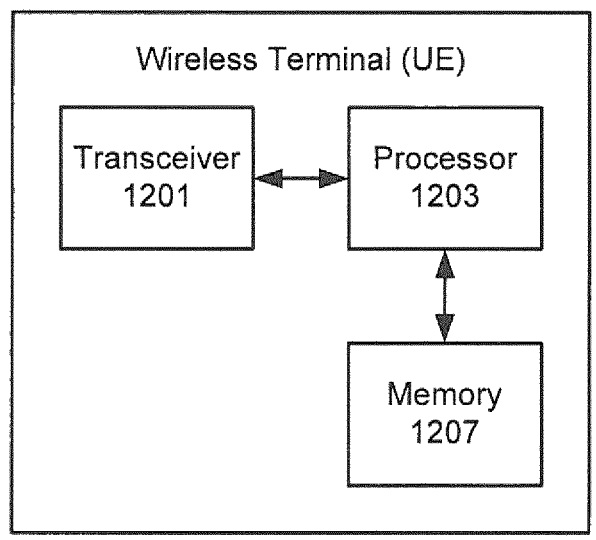
FIG. 12 is a block diagram illustrating a wireless terminal according to some embodiments of inventive concepts.

FIG. 12 is a block diagram illustrating elements of a wireless terminal UE of FIG. 10. As shown, a wireless terminal UE may include a transceiver circuit 1201 (also referred to as a transceiver) including a transmitter and a receiver configured to provide radio communications with a base station BS, a processor circuit 1203 (also referred to as a processor) coupled to the transceiver circuit, and a memory circuit 1207 coupled to the processor circuit. The memory circuit 1207 may include computer readable program code that when executed by the processor circuit 1203 causes the processor circuit to perform operations according to embodiments disclosed herein. According to other embodiments, processor circuit 1203 may be defined to include memory so that a memory circuit is not separately provided.

Figure 13:
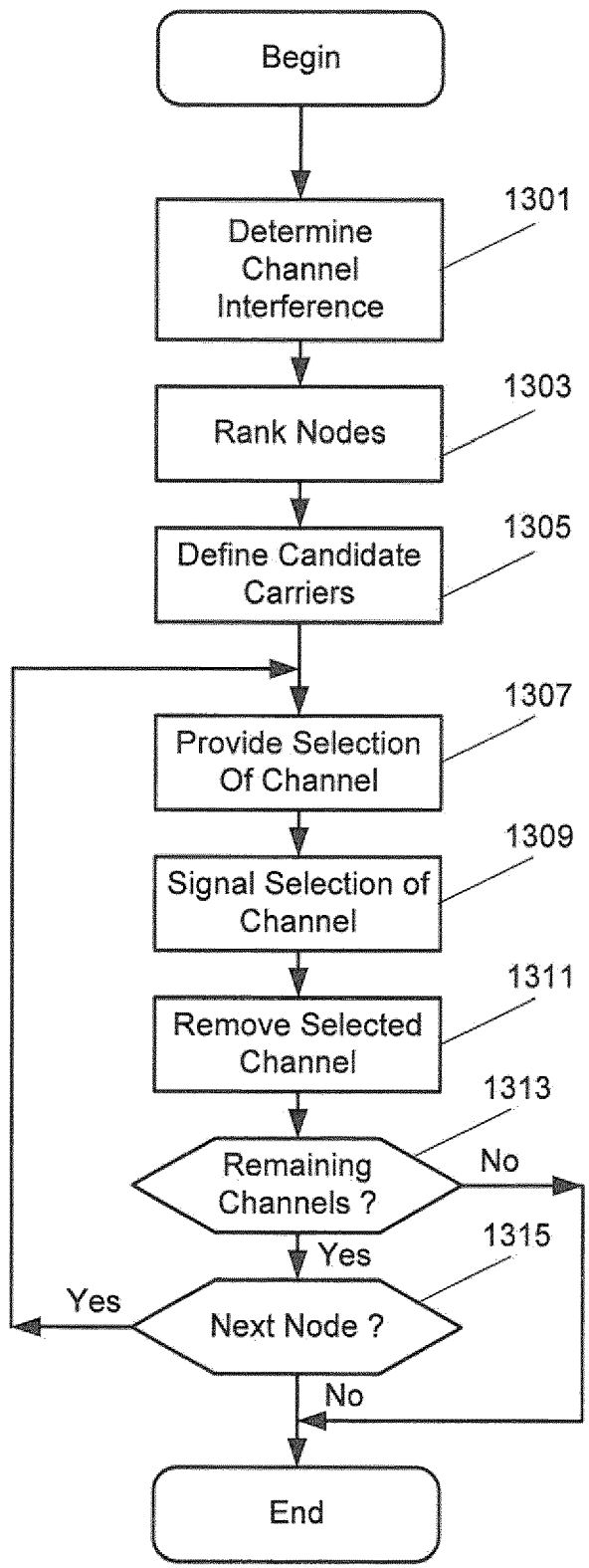
FIGS. 13-15 are flow charts illustrating operations according to some embodiments of inventive concepts.

FIG. 13 is a flow chart illustrating operations of network node processor 1103 to coordinated carrier selection (CCS) in a Licensed Assisted Access (LAA) telecommunications system according to some embodiments of present inventive concepts. As disclosed herein, the LAA telecommunications system may include at least two LAA network nodes. The network node performing operations of FIG. 13 may be separate from the at least two LAA network nodes referenced above, or the network node performing operations of FIG. 13 may be one of the at least two LAA network nodes. Moreover, each of the at least two LAA network nodes may be an LAA evolved NodeB (eNB), and/or the node performing operations of FIG. 13 may be an LAA eNB. In addition, the node performing operations of FIG. 13 and the at least two LAA network nodes may be operated by a single operator.

At block 1301, network node processor 1103 may determine channel interference of the at least two LAA network nodes based on unlicensed carriers. For example, network node processor 1103 may receive information regarding channel interference from the at least two LAA network nodes through network interface 1105. At block 1303, network node processor 1103 may then rank the at least two LAA network nodes based on the channel interference of the at least two LAA network nodes.

At block 1305, network node processor 1103 may define a set of unlicensed candidate carriers for channels in the LAA telecommunications system. At block 1307, network node processor may provide a selection for one of the at least two LAA network nodes, of a channel from the set of unlicensed candidate carriers for channels, and the order in which the selection is provided may be based on ranking the at least two LAA network nodes. More particularly, selection for the LAA network node having a higher channel interference is provided before selection for the LAA network node having lower channel interference.

Responsive to ranking the at least two network nodes and providing the selection, network node processor 1103 may signal selection of at least one unlicensed carrier through network interface 1105 to at least one of the two LAA network nodes at block 1309. At block 1311, network node processor 1103 may remove the selected channel is from the set of candidate carriers for channels.

For each remaining channel of the set, network node processor 1103 may repeat operations of blocks 1307, 1309, and 1311 for each next LAA network node at block 1313, until there are no remaining channels in the set. Moreover, the next node for selection may be identifier at block 1315 based on the relative channel interference determined at the respective nodes.

Figure 14:
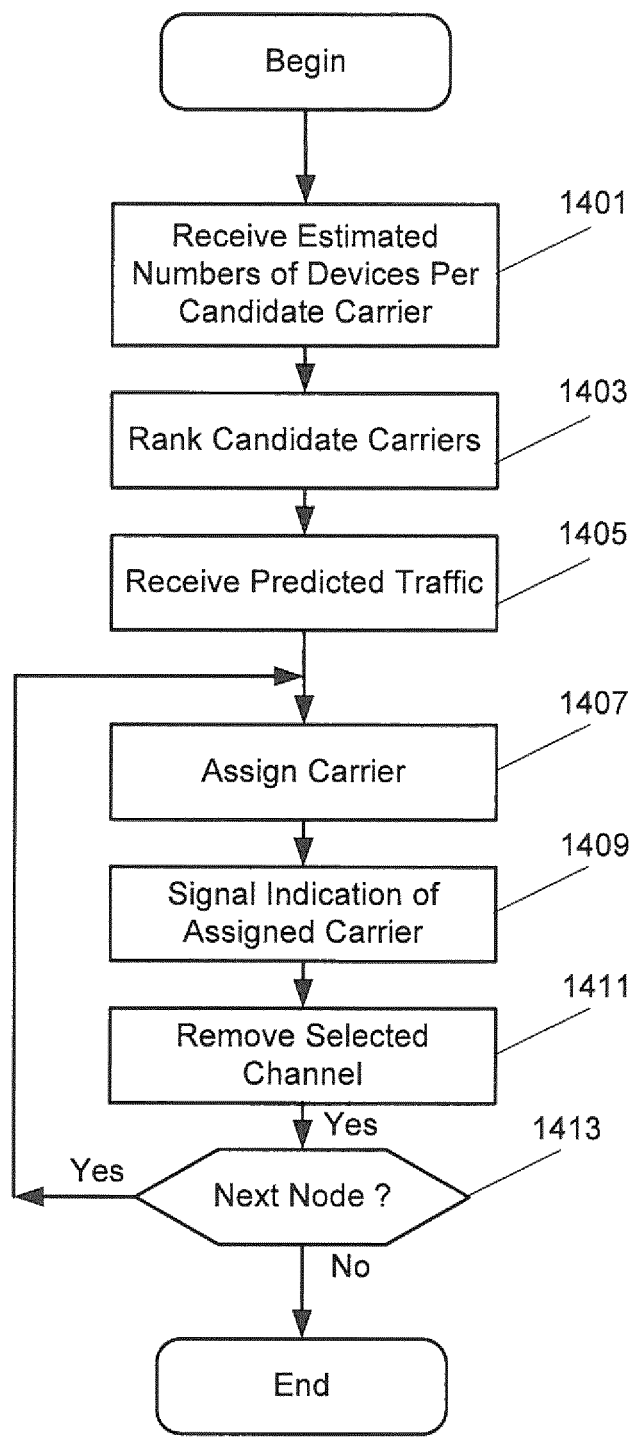

FIG. 14 is a flow chart illustrating operations of network node processor 1103 to coordinated carrier selection (CCS) in a Licensed Assisted Access (LAA) telecommunications system according to some embodiments of present inventive concepts. As disclosed herein, the LAA telecommunications system may include at least two LAA network nodes. The network node performing operations of FIG. 14 may be separate from the at least two LAA network nodes referenced above, or the network node performing operations of FIG. 14 may be one of the at least two LAA network nodes. Moreover, each of the at least two LAA network nodes may be an LAA evolved NodeB (eNB), and/or the node performing operations of FIG. 14 may be an LAA eNB. In addition, the node performing operations of FIG. 14 and the at least two LAA network nodes may be operated by a single operator.

At block 1401, network node processor 1103 may receive estimated numbers of devices per unlicensed candidate carrier from each of the at least two LAA network nodes through network interface 1105, wherein the estimated numbers of devices per unlicensed candidate carrier are obtained from the at the least two network nodes respectively. More particularly, the estimated numbers of devices per unlicensed candidate carrier may be an estimated number of non-LAA devices (e.g., WiFi Access Points) per unlicensed candidate carrier. At block 1403, network node processor may rank the unlicensed candidate carriers based on a consensus of the estimated numbers of devices per unlicensed candidate carrier.

At block 1405, network node processor 1103 may receive predicted traffic loads from the at least two LAA network nodes in the LAA telecommunications system. At block 1407, network node processor 1103 may assign a carrier to a first one of the at least two LAA network nodes based on the ranking of the unlicensed candidate carriers and on the predicted traffic loads. At block 1409, network node processor 1103 may signal an indication of the assigned carrier to the first one of the least two LAA network nodes, and at block 1411, the assigned carrier may be removed from the set available for subsequent selection.

At block 1413, operations of blocks 1407, 1409, and 1411 may be repeated for each LAA network node.

Figure 15:
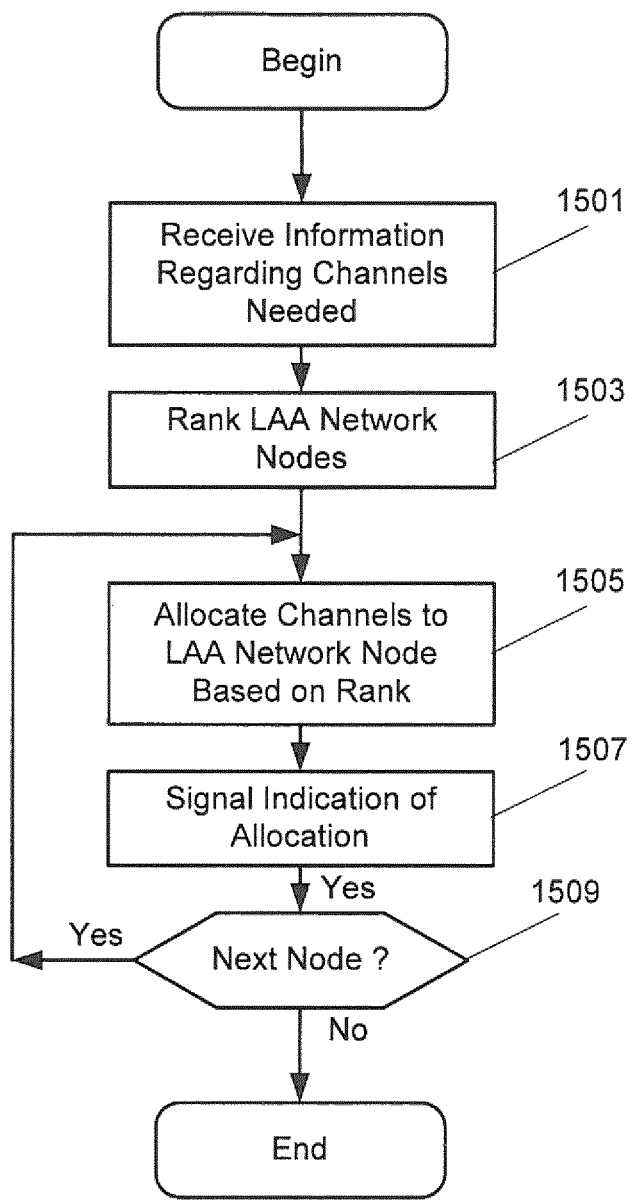

FIG. 15 is a flow chart illustrating operations of network node processor 1103 to coordinated carrier selection (CCS) in a Licensed Assisted Access (LAA) telecommunications system according to some embodiments of present inventive concepts. As disclosed herein, the LAA telecommunications system may include at least two LAA network nodes. The network node performing operations of FIG. 15 may be separate from the at least two LAA network nodes referenced above, or the network node performing operations of FIG. 15 may be one of the at least two LAA network nodes. Moreover, each of the at least two LAA network nodes may be an LAA evolved NodeB (eNB), and/or the node performing operations of FIG. 15 may be an LAA eNB. In addition, the node performing operations of FIG. 15 and the at least two LAA network nodes may be operated by a single operator.

At block 1501, network node processor 1103 may receive information related to a number of unlicensed channels needed for each of the at least two LAA network nodes through network interface 1105. At block 1503, network node processor 1103 may rank the at least two LAA network nodes based on the number of unlicensed channels needed for each of the at least two LAA network nodes. At block 1505, network node processor 1103 may allocate a number of unlicensed channels to a first one of the at least two LAA network nodes that indicates a greatest need for unlicensed channels such that a sum of adjacent channel leakage to other unlicensed channels is reduced. For example, allocating unlicensed channels may include allocating the number of unlicensed channels from a set of unlicensed channels so that the number of unlicensed channels are within a bandwidth, and so that all other unlicensed channels of the set are outside the bandwidth.

At block 1507, network node processor 1103 may signal an indication of the allocated number of unlicensed channels through the network interface to the first LAA network node. At block 1509, operations of blocks 1505 and 1507 may be repeated for each of the at least two LAA network nodes.

Abbreviations

CA Carrier Aggregation
CCA Clear Channel Assessment
CCS Coordinated Carrier Selection
DCF Distributed Coordination Function
DFS Dynamic Frequency Selection
DL Downlink
eNB evolved NodeB, base station
TTI Transmission-Time Interval
LAA Licensed Assisted Access
LTE-U LTE in Unlicensed Spectrum
LBT Listen Before Talk
PDCCH Physical Downlink Control Channel
PUSCH Physical Uplink Shared Channel
RCPI Received Channel Power Indicator
RSNI Received Signal to Noise Indication
RSSI Received Signal Strength Indicator
SCell Secondary Cell
UE User Equipment
UL Uplink

EXAMPLE EMBODIMENTS

Embodiment 1

A method for coordinated carrier selection (CCS) in a Licensed Assisted Access (LAA) telecommunications system, the LAA telecommunications system comprising at least two LAA network nodes, the method comprising: determining the channel interference of the at least two network nodes; and ranking the at least two network nodes based on their channel interference.

Embodiment 2

The method of Embodiment 1 further comprising: defining a set candidate carriers for channels in the LAA telecommunications system; and receiving a selection, from one of the at least two LAA network node, of a channel from the candidate set, wherein the order in which the selection is received is based on the ranking of the at least two network nodes.

Embodiment 3

The method of Embodiment 1-2, wherein the selected channel is removed from the candidate set.

Embodiment 4

The method of Embodiment 1-3, wherein the selection from the network node having the higher channel interference is received before the network node having lower channel interference.

Embodiment 5

The method of Embodiment 1-4, wherein the network the telecommunications system is operated by a single operator.

Embodiment 6

The method of Embodiments 1-5, wherein the LAA network node is a LAA evolved NodeB (eNB).

Embodiment 7

A node in a Licensed Assisted Access (LAA) telecommunications system configured to perform the method steps of Embodiments 1-6.

Embodiment 8

A method in Licensed Assisted Access (LAA) network node for coordinated carrier selection (CCS) in a LAA telecommunications system, the LAA telecommunications system comprising at least two LAA network nodes, the method comprising: estimating the number of devices per candidate carrier at the network node; exchanging the estimated number of candidate carriers with the at least one other network node, wherein the an estimated number of devices per candidate carrier is obtained at the least two network nodes; and ranking the candidate carriers based on the estimated number of device per carrier.

Embodiment 9

The method of Embodiment 8, further comprising: predicting the traffic load at the network node; and exchanging or the predicted traffic load with at least one other LAA network node in the LAA telecommunications system.

Embodiment 10

The method of Embodiment 9, further comprising: assigning a carrier to at least one LAA network node based on the ranking of the carrier and on traffic load at the LAA network node.

Embodiment 11

The method of any of Embodiments 8-10, wherein the device is a non-LAA device.

Embodiment 12

The method of any of Embodiments 8-10, wherein the device is a Wi-Fi device.

Embodiment 13

The method of any of Embodiments 8-12, wherein the LAA network node is a LAA evolved NodeB (eNB).

Embodiment 14

A coordinated carrier selection (CCS) method in Licensed Assisted Access (LAA) telecommunications system comprising at least two LAA network nodes, the method comprising: determining the number of channels needed for the at least two LAA network nodes; exchanging information related to the number of channels need between the at least two LAA network nodes; ranking the at least two LAA network nodes based on the number of channels needed; allocating the needed number of channels to the LAA network node that needs the highest number of channels such that the sum adjacent channel leakage to other channels is minimized.

Embodiment 15

A node in a Licensed Assisted Access (LAA) telecommunications system configured to perform the method step of Embodiment 14.

Further Definitions

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method in a network node for carrier selection in a telecommunications system, the telecommunications system comprising at least two network nodes, the method comprising:

receiving estimated numbers of devices per candidate carrier from each of the at least two network nodes, wherein the estimated numbers of devices per candidate carrier are obtained from the at the least two network nodes respectively; and ranking the candidate carriers based on a consensus of the estimated numbers of devices per candidate carrier.

2. The method of claim 1, further comprising:

receiving a predicted traffic load from at least one of the network nodes in the telecommunications system.

3. The method of claim 2, further comprising:

assigning a carrier to the at least one network node based on the ranking of the candidate carriers and on the predicted traffic load.

4. The method of claim 3, further comprising:

signaling an indication of the assigned carrier to the at least one network node.

5. The method of claim 1, wherein the estimated numbers of devices per candidate carrier is an estimated number of devices per candidate carrier operating outside the telecommunications system.

6. The method of claim 1, wherein the estimated numbers of devices per candidate carrier is an estimated number of Wi-Fi devices per candidate carrier.

7. The method of claim 1, wherein each of the at least two network nodes is an evolved NodeB (eNB).

8. The method of claim 1 wherein each of the candidate carriers is an unlicensed candidate carrier.

9. The method of claim 1, wherein the method for carrier selection is a method for coordinated carrier selection (CCS), wherein the telecommunications system is a Licensed Assisted Access (LAA) telecommunications system, and wherein the at least two network nodes are at least two LAA network nodes.

10. A node providing carrier selection in a telecommunications system, the telecommunications system comprising at least two network nodes, the node comprising:

a network interface configured to provide communication with other nodes of the telecommunications system; and a processor coupled with the network interface, wherein the processor is configured to, receive estimated numbers of devices per candidate carrier from each of the at least two network nodes through the network interface, wherein the estimated numbers of devices per candidate carrier are obtained from the at least two network nodes respectively, and rank the candidate carriers based on a consensus of the estimated numbers of devices per candidate carrier.

* * * * *